United States Patent [19]

Johnson et al.

[11] 4,298,083

[45] Nov. 3, 1981

[54] FLEXIBLE FILM AIR PALLET FOR MATERIAL MOVEMENT

[75] Inventors: Raynor A. Johnson; Ralph M. Barrow, Jr., both of Newark, Del.

[73] Assignee: American Industrial Research, Newark, Del.

[21] Appl. No.: 48,111

[22] Filed: Jun. 13, 1979

[51] Int. Cl.³ .............................................. B60V 1/04
[52] U.S. Cl. ..................................... 180/125; 414/676
[58] Field of Search ...................... 180/125, 124, 116; 414/676

[56] References Cited

U.S. PATENT DOCUMENTS

| | | | |
|---|---|---|---|
| 3,161,247 | 12/1964 | Mackie | 180/124 |
| 3,281,963 | 11/1966 | Johnson | 180/125 |
| 3,375,893 | 4/1968 | Mackie | 180/124 |
| 3,760,899 | 9/1973 | Crossman | 180/125 |
| 3,834,556 | 9/1974 | Crimmins | 180/125 |
| 3,948,344 | 4/1976 | Johnson | 180/124 |
| 4,155,421 | 5/1979 | Johnson | 180/125 |

Primary Examiner—John P. Silverstrim
Attorney, Agent, or Firm—Sughrue, Mion, Zinn, Macpeak and Seas

[57] ABSTRACT

A flexible film sheet underlying a backing member bearing a load and directly overlying a planar, fixed support surface and partially defining a plenum chamber, and having perforations within the flexible film sheet facing the support surface, extends laterally beyond the load to form an extension of the air plenum chamber. Air inlet means opens to the plenum chamber extension portion, and a seal line extends diagonally inwardly from the juncture of the air inlet means and the plenum chmber extension portion to a point near or beneath the load to effectively jack the load from the air inlet means laterally and automatically balance the load on the air pallet during jacking, while reducing the possibility of rupture of the flexible film sheet in the vicinity of the air inlet.

11 Claims, 6 Drawing Figures

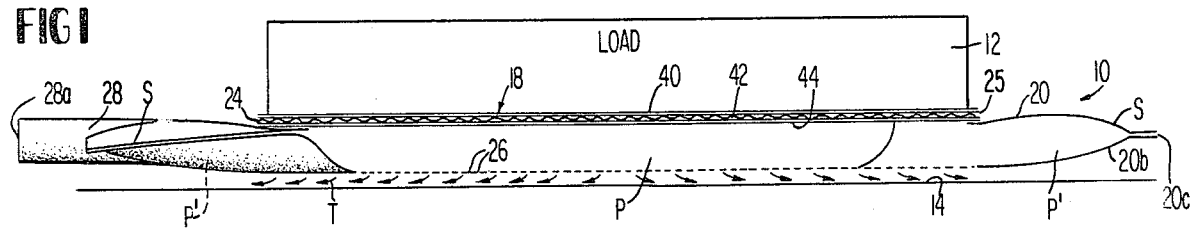
FIG 1
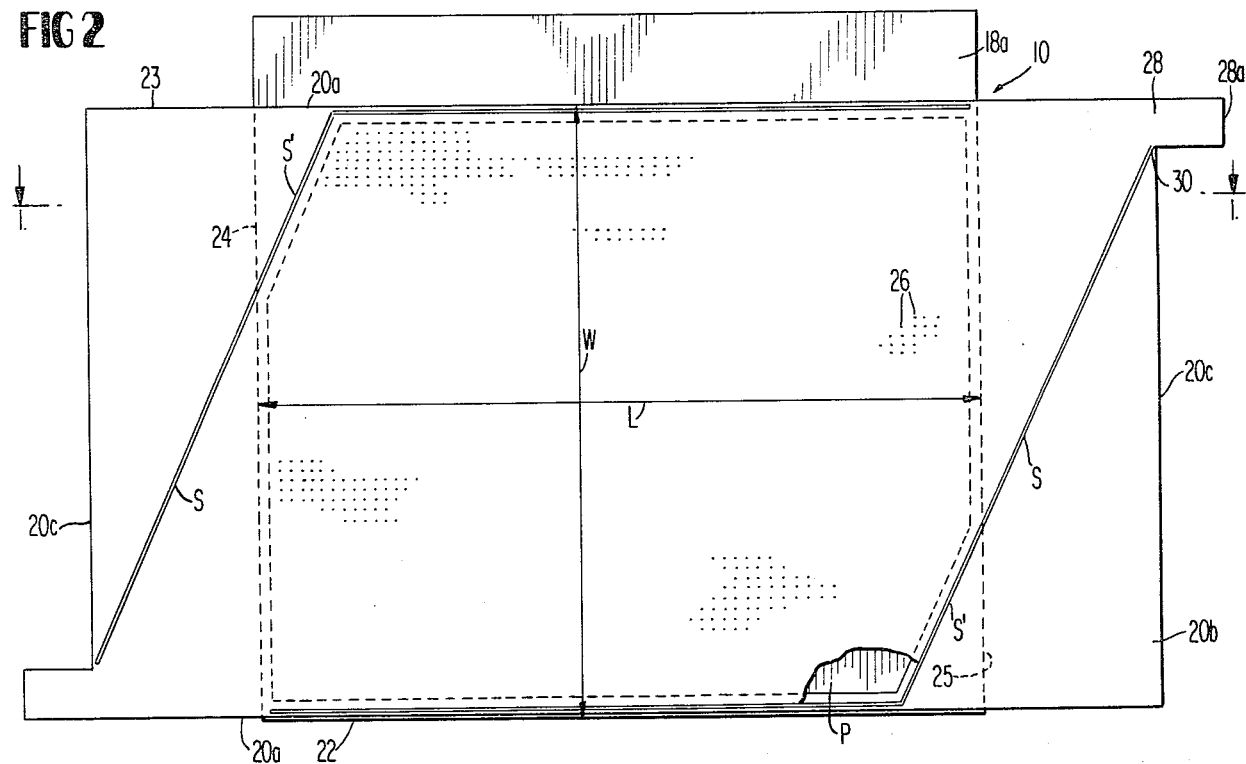
FIG 2
FIG 4

FLEXIBLE FILM AIR PALLET FOR MATERIAL MOVEMENT

BACKGROUND OF THE INVENTION

1. Field of the Invention

This invention relates to planar, flexible film air pallets, and more particularly, to an improved low cost air pallet employing thin flexible film sheet material.

2. Description of the Prior Art

Recently, flexible film air pallets have come into vogue to permit relatively heavy loads to be transported across fixed, horizontal support surfaces, with minimal frictional restraint due to the air bearing existing between the pallet and that support surface. U.S. Pat. No. 3,948,344 issuing Apr. 6, 1976, to Raynor A. Johnson and William D. Fletcher and entitled "LOW COST PLANAR AIR PALLET MATERIAL HANDLING SYSTEM" is representative of such air pallets.

The present air pallet constitutes an improvement within this art. The air pallet of U.S. Pat. No. 3,948,344 may take the form of a single flexible film sheet which is fixed about its edges directly to a load and being perforated within an area lying beneath the load with air inlet means to one side of the film sheet and with air dispersion means incorporated within that structure to insure distribution of the air entering the inlet to all areas beneath the load for discharge through the multiple perforations within the flexible sheet.

In addition to the air dispersion means, it is necessary to provide means to insure jacking of the load, that is, raising of the load some vertical distance from the fixed support surface and the creation of the plenum chamber, all without ballooning of the air pallet and resultant tipping or excessive tilting of the load. A portion of the flexible film sheet at the edges of the load is preferably non-perforated such that initially with the load pressing the perforated portion of the flexible film sheet against the fixed support surface, in order for the air to escape, the load must be jacked to the extent that some edge perforations are exposed, that is spaced some distance from the fixed load support surface. The air escapes, at which point an equilibrium "jacked" position is reached where the load is supported several inches above the fixed support surface on an air film created between the loaded pallet and the fixed support surface. The load may then be moved frictionlessly horizontally relative to the fixed load support surface regardless of minor variations in contour, surface roughness or the like, both with respect to the fixed support surface and the load or air pallet.

Additional embodiments of the invention in U.S. Pat. No. 3,948,344 are directed to air pallets where a flexible film bag functions as the primary member of the air pallet, and is affixed to the lower surface of the load and bears perforations on the bag wall immediately facing the fixed load support surface, with an integral tube, extending from the side of the air bag and being coupled to a wand through which air under pressure is directed to pressurize the plenum chamber formed by the bag. In such cases, either internally or externally, air dispersion means must be provided to insure the distribution of air throughout the plenum chamber to accomplish jacking of the load and permit air escape through the perforations to define the air bearing for the air pallet supported load.

While the air pallet employing the flexible film sheet as a single layer of a laminated air pallet structure or where dual flexible sheets in the form of an air bag such as a plastic garbage bag may function totally to define the air plenum chamber for the air pallet, certain problems arise particularly where the flexible film sheets are relatively fragile. First, where the bag or similar structure terminates in an integral tube which is coupled in turn to a vacuum cleaner wand or similar metal tubular structure acting as a conduit for the air under pressure from a pack carried or vehicle carried compressed air source, there is a tendency for the air bag or flexible sheet to tear as a result of air-pressure induced stress occurring at the line of juncture between the tube or air inlet portion of the flexible film sheet or bag and the main portion of the film or sheet defining the plenum chamber. Secondly, where the air inlet opens to the air bag or flexible film sheet portion defining wholly or partially the plenum chamber, the jacking of the load and pillowing of the air bag or flexible film sheet portion of the air pallet has resulted in the tilting of the load in a direction towards that portion which is still pressed into contact with the relatively fixed load support surface, causing the load to be dumped from the air pallet. In addition, this increases severely the stress to the portion of the air pallet partially filled with air at relatively high pressure, particularly in the area of the inlet to the flexible film sheet or air bag.

Where the inlet tube to the flexible film sheet or to the air bag abuts directly a load bearing area, that is, opens up into a plenum chamber which is completely closed due to the press of the load on the surface area of the bag or flexible film adjacent the air inlet, jacking of the load in many cases simply cannot be achieved.

Further, it is under these circumstances, that there is a great tendency due to the high air pressure and zero flow conditions for the bag or flexible film sheet to rupture at the area where the air enters the same, particularly where the bag or flexible film sheet is provided with an integral tube acting as an air inlet to the plenum chamber.

SUMMARY OF THE INVENTION

The present invention constitutes an improvement in an air pallet for frictionless movement of a load supported thereon by a relatively rigid planar backing member, relative to an underlying generally planar, fixed support surface. The air pallet includes a flexible film sheet underlying the backing member and directly overlying the support surface and partially defining an air plenum chamber. A portion of the flexible sheet facing the support surface is perforated with the perforations unrestrictedly opening into the plenum chamber. Air dispersion means are provided for insuring air flow throughout the chamber when the pallet is under load and pressurized air is fed to the plenum chamber and means for controlling pillowing of the flexible sheet portion of the chamber to permit jacking of the backing member and the load sufficiently to permit the pallet to accommodate surface irregularities for both the load support surface and the backing member without ballooning. Air inlet means are provided to the plenum chamber for permitting air under pressure to enter the chamber for jacking the load and for discharge through the perforations to create a positive pressure air film between the thin flexible sheet and the fixed support surface.

The improvement resides in the thin flexible sheet including a portion extending laterally to one side of the load to form a plenum chamber extension portion outside of the air pallet load bearing area with the air inlet means carried by said the flexible sheet extension portion and spaced from the air pallet load bearing area and wherein a seal line seals a portion of the plenum chamber extension portion and extends diagonally inwardly from the junction of the air inlet and the thin flexible sheet towards the load bearing area such that air enters the plenum chamber without rupture of the thin flexible film at the air inlet, and is applied progressively, laterally, to the load from the air inlet to a lateral edge of the air pallet without excessive ballooning of the bag in the area of air entry to automatically balance the load during jacking of the same.

Preferably, the air inlet means comprises an integral air inlet tube within the thin flexible sheet extension portion with the diagonal seal line eminating at the inlet tube and terminating beneath the load at the plenum chamber partially defined by the thin flexible sheet. In one form, the generally rigid, planar backing member comprises a generally rigid sheet. The flexible sheet is edge sealed to the generally rigid sheet, and a portion of the flexible sheet is folded over itself along one lateral edge to form the plenum chamber extension portion. In another form, the relatively rigid planar backing member comprises the load, a flexible air bag underlies the load, and a portion of the air bag extends laterally beyond the load to form the plenum chamber extension portion and the flexible air bag includes at least one integral flexible film tube defining the air inlet means. Pressure sensitive adhesive may fix the surface of the flexible air bag remote from the planar fixed support surface to the load. In another form, a generally rigid sheet comprises a slip sheet, acts as the relatively rigid planar backing member and is provided with an integral pull tab. A single layer of thin flexible film may directly underlie the slip sheet and may be sealed at its periphery to the edges of the slip sheet and includes a folded over portion to one side of the slip sheet to form the plenum chamber extension portion.

BRIEF DESCRIPTION OF THE DRAWINGS

FIG. 1 is a vertical sectional view of one embodiment of the improved flexible film air pallet of the present invention, taken about line 1—1 of FIG. 2.

FIG. 2 is a bottom plan veiw of the embodiment of the invention shown in FIG. 1.

FIG. 4 is a bottom plan view of yet another embodiment of the present invention.

DESCRIPTION OF THE PREFERRED EMBODIMENTS

Figure 3:
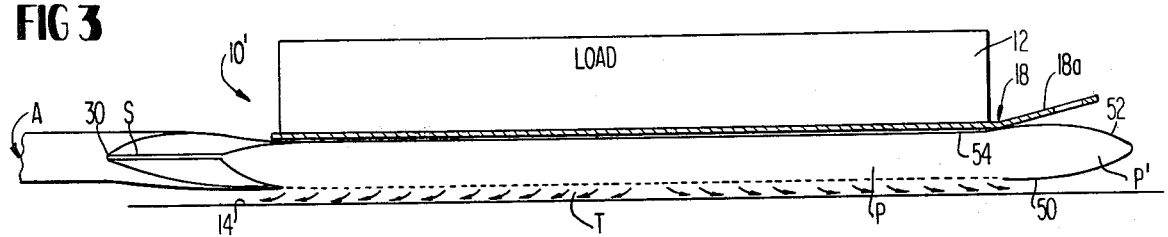
FIG. 3 is a vertical sectional view of a second embodiment of the air pallet of the present invention taken about line 3—3 of FIG. 4.

Referring to FIGS. 1-2, one embodiment of the present invention may be seen with the air pallet indicated generally at 10 and acting to support a load 12 for movement over a generally rigid support surface 14 as defined by a concrete flooring 16 of a warehouse or the like. The improved flexible film air pallet 10 consists essentially of two basic elements or members: a generally rigid backing member in the form of a corrugated board or slip sheet as at 18, and a thin, flexible film sheet as at 20. The sheet 20 may be formed of appropriate plastic such as polyvinyl chloride, polethylene, or the like. The corrugated board 18 preferably comprises a slip sheet of rectangular configuration, having a long side and a short side and being, for instance, on the order of 40×48 inches, the opposed long sides being indicated at 22, 23 FIG. 2, and the short sides at 24, 25. Additionally, a 6 inch wide flap 18a is provided along one side, in this case the long side 23 of the slip sheet 18, permitting the the slip sheet to be grasped by a fork lift push-pull grab device of conventional construction (not shown), thereby effecting either a pulling or pushing action to the slip sheet 18 and the load 12 carried thereby. The load 12 may comprise a carton filled with some contents (not shown), and for illustration purposes the load is rectangular in form, is dimensioned closely to that of the slip sheet portion defined by edges or sides 22, 24 and would thus be nearly 40×48 inches in horizontal cross-section. The flexible film sheet indicated generally at 20 is of a width equal to the width W from one long side 22 to the other long side 23 of the slip sheet 18. However, its length is in excess of the length L from one short side or edge 24 of the slip sheet to its other short side 25, FIG. 2. The opened long edges 20a of the flexible film sheet 20 are sealably bonded to the respective long sides 22, 23 of the slip sheet. The thin film sheet 20 and the slip sheet 18 thereby define an air plenum chamber P beneath the load 22. Further, a portion of the thin flexible sheet 20 which underlies the load is perforated within the load bearing area with small diameter perforations 26 facing the rigid support surface 14 and opening directly to the plenum chamber P, such that air escaping through the perforations 26 forms a thin film of air which air tends to escape from beneath the load and air pallet 10 as indicated by the arrows T, defining a positive pressure air bearing.

Important to the present invention, is the formation of at least one plenum chamber extension portion as at P', (in this case two) at respective left and right longitudinal ends of the air pallet. Specifically, the thin flexible sheet 20 is extended at both ends by portion 20b which are edge sealed to the short sides 24, 25 of the slip sheet 18. In this case the plenum chamber extension portions P' extend outside of the load bearing area of the air pallet and one of these chamber portions P' is initially inflated with air received through its air inlet means, generally indicated at 28 or air inlet tube, preferably unitary and integral with the thin plastic film sheets 20. In this case, the air inlet tubes 28 are at diametrically opposed corners of the air pallet.

The thin film sheet extension portions 20b are folded over about fold lines 20c extending parallel to the lateral or short edges 24, 25 of the slip sheet 18. Air inlet tubes 28 extend outwardly and away from respective plenum chamber extension portions 20a and at one corner of the same. The outer end 28a of the tubes are open, and permit the insertion within those air inlet tubes of a suitable vacuum cleaner wand (not shown) or the like, after which a rubber band may be applied to the outside of the tube 28 to frictionally clamp the tube to the exterior of the wands. The wand may be supplied air under pressure as from a portable air compressor unit (not shown) of similar size to the air pump for a vacuum cleaner with the exception that the wand provides positive air pressure rather than vacuum pressure to the plenum chamber P via a plenum chamber extension P'. Suitable valves (not shown) are preferably applied to the tubes, so that when the right-hand tube, FIG. 2, is being supplied air, air will not escape outwardly from the plenum chamber P through the left-hand tube 28 diametrically across from the tube 28 receiving air. The plenum chamber P must sustain enough pressure to overcome the weight of the load 12, and initially the function of the plenum chamber P is to jack or elevate the load 12 to a point where the outer several rows of peripheral perforations 26 open to the extent that air escape from the plenum chamber is equal to that being applied to the tube as shown by arrows T, FIG. 1. Further, because of the thin flexible nature of the sheet 20, controlled pillowing of that sheet to define the plenum chamber P and to lift or jack the load 12 upwardly is achieved without ballooning of the sheet 20 to the extent where the load 12 will tilt and fall off the air pallet 10. The extent of pillowing is determined by the excess in surface area of the thin film sheet 20 with respect to that of the slip sheet 18 portion bearing the load 12 and the extent of the surface area of the thin flexible sheet covered by the perforations 26, as shown. As indicated previously, the load will rise and controlled pillowing is achieved to the point where the outer row or rows of perforations 26 are moved some distance from the generally rigid support surface 14, permitting in this area, the relatively unimpeded escape of air as at T from plenum chamber P.

A very important aspect of the present invention resides in the seal line S for plenum chamber and its extensions, extending from the point of juncture 30 between tubes 28 and the extension portions 20b of the flexible sheet in each instance, in this case at one end of the fold line 20c, and sealing the top and bottom folds of the flexiblee sheet extension portions 20b through their longitudinal extent, with the seal lines, in each case continuing into the area of perforations 26 and within the load bearing area, that is beneath the load 12. In this case, sealing of the flexible sheet 20 directly to the slip sheet 18 occurs for portion S' of the seal line S. Seal line portion S' extends completely to a longitudinal edge 22, 23 in each instance, well inside the load bearing area. The tendency, therefore, is for the air upon entering the tube 28 to cause a pillowing action to the folded over thin film extension portion 20a, filling the plenum chamber extension portion P' progressively transversely, from tube 28 towards edge 22 with the cross air flow effect acting to achieve lifting progressively of the load 12 from one longitudinal edge nearest a given inlet tube 28 being used towards the opposite longitudinal edge. Because of the reduced surface area provided by the line S and its portion S' as it approaches a longitudinal edge of the slip sheet 18, the load 12 is essentially jacked upright without tilting and the load is balanced automatically during jacking due to the controlled distribution of the air through the plenum chamber extension portion P' by the seal line S and plenum chamber P by portion S' of the seal line. With air applied only to the left-hand tube 28, FIGS. 1 and 2, there would be a tendency for the load to be jacked upwardly at least initially on the left, FIGS. 1-2, with some tilting prior to the plenum chamber P being completely pressurized and lifting the load 22 to a height as determined by the location of the perforations 26.

Further, since the seal line is not at right angles to tube 28 where it meets with that member, as is the fold line 20c, there is exerted less stress at the point where the air enters the plenum chamber extension P' from the air inlet tubes 28, thus reducing the possibility of tearing of tubes and loss of air, particularly when air pressure is applied under heavy load.

It may be appreciated that air either enters at large pressure and low flow rate or CFM, or large CFM and low pressure, this being inherent characteristics of air flow, particularly where jacking terminates and air starts to disperse through the perforated flexible sheet 20 to form the air bearing T between the flexible sheet 20 and the generally rigid support surface 14.

In terms of the specific make up of the elements of the air pallet 10, the slip sheet 18 may comprise cardboard. This permits the air pallet to constitute a throwaway unit. It preferably comprises an upper, flat paperboard sheet 40, an inner corrugated paperboard sheet 42 and a lower flat paperboard sheet 44. The sheets are bonded to each other in the area of the crests and valleys of the corrugations of the intermediate sheet 42 by suitable adhesive. Alternatively, the slip sheet 18 may constitute a molded corrugated plastic structure, permitting extensive re-use of the slip sheet 18 and its flexible film sheet 20. Further, for the flexible film sheet extension portions 20b, the edges are preferably heat sealed. Preferably the film is formed of plastic and capable of being thermobonded to itself as well as to the slip sheet 18 at its edges to define a closed plenum chamber P with the exception of the perforations 26 of the thin flexible sheet 20, and the air inlets 28.

As in the case of U.S. Pat. No. 3,948,344, the total lift capability of the air pallet is equal to the effective air pressure internally within plenum chamber P times the area in contact with the floor, and the size and number of the holes or perforations are determined by an area equal to or less than the air supply area. The weight of the load divided by that area gives the minimum pressure needed for initial lift and the excess pressure over minimum necessary to lift will regulate the amount of unsupported floor area the pallet can cross. If these are exceeded, the air pallet bottoms and the load is no longer frictionlessly transported.

The air pressure is increased so that there is always an excess in air volume between of that supplied and that needed to maintain an effective height air film T between the air pallet and the load support surface 14.

Referring next to FIGS. 3 and 4, a second embodiment of the invention has the same load 12 positioned upon a slip sheet which is essentially identical to the slip sheet 18 of the embodiment of FIGS. 1-2. In this respect and in respect to all embodiments of the invention, like elements are given like numerical designations. In this case, however, the air pallet 10' is not comprised of a slip sheet plus a single thin flexible sheet such a that at 20. In this case, the thin flexible sheet is defined by a bottom layer or bottom wall 50 of an open ended flexible thin plastic film bag indicated generally at 52, the bag further including a top wall or upper layer 54 which is an integral extension of the bottom layer 50 and which extends not only the complete longitudinal length L of slip sheet 18, but also the bag extends beyond the slip sheet 18 so as to form a plenum chamber extension portion P' to the left of the plenum chamber P at the load bearing area of the air pallet 10'. In similar fashion to the embodiment of FIG. 1, at one corner the bag 52 is provided with an air inlet tube 28 which is integral therewith and opens directly into the plenum chamber extension portion P', whereby initial pressurization occurs upon delivery of air under pressure by a wand or like element (not shown) as indicated by arrow A, to the left, FIG. 3.

Again, the embodiment of the invention shown in FIG. 3, involves a seal line S which emanates from the inner end of the air inlet tube 28 at the point 30, where the tube 29 joins the bag 52, sealing off a portion of the air bag extension portion 56 to form an air bag plenum extension area. The seal line S causes the air to flow along the diagonal seal line, gradually and uniformly jacking or lifting the load 12 vertically and permitting the air to enter plenum chamber P and pressurize the same. In the embodiment of the invention of FIG. 3, the slip sheet 18 is provided with a flap as at 18a, in this case as a longitudinal extension of the air pallet and to permit, as indicated by arrow 57, pulling of the air pallet and its load 12, while air is continuously supplied to the air pallet and escapes through perforations 26 within the bottom wall 50 of the air bag 52. The slip sheet 18 functions as a generally rigid backing member for the load 12, the perforated area of the bag bottom wall 50 which does not cover the full surface area of that bottom wall permits controlled pillowing of the air bag and the creation of the air bearing as indicated by arrow T between the air bag and the generally planar support surface 14. The seal line S not only functions as the air dispersion means, but it prevents rupture of the air bag at the inner end of the air inlet tube 28 and insures progressive jacking of the load 12 and acts as an automatic balancing device for that load.

Figure 5:
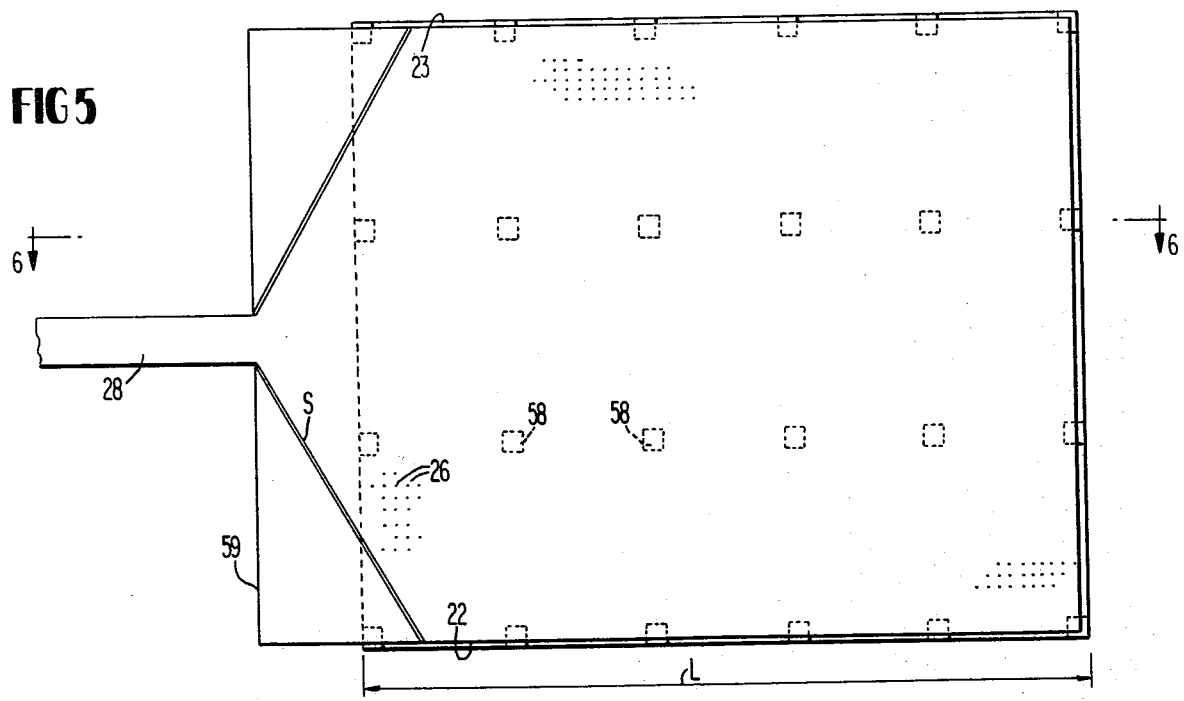
FIG. 5 is a bottom plan view of yet a third embodiment of the present invention.
Figure 6:
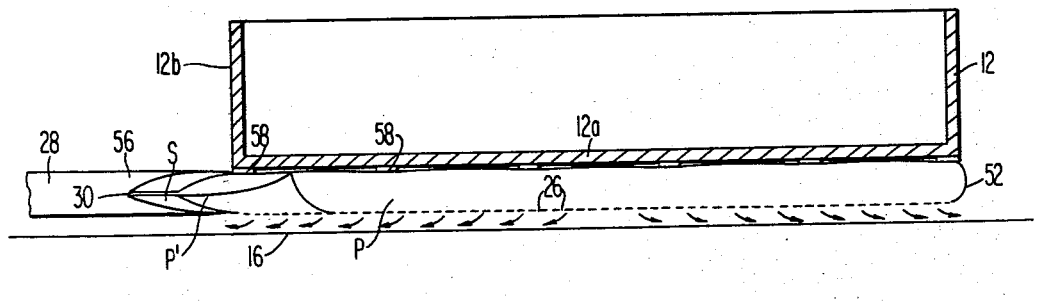
FIG. 6 is a vertical sectional view of the embodiment of the invention shown in FIG. 5 taken about line 6—6.

Reference to FIG. 5 shows a further embodiment of the invention, where the slip sheet is eliminated, and the air bag 52 is attached directly to the bottom wall 12a of the load 12 at multiple locations, preferably by the use of pressure sensitive adhesive patches 58. The pressure sensitive adhesive is borne by the upper wall 54 of the air bag 52. The lower wall 50 of the bag is perforated as at 26 over a substantial portion of its surface area, but leaving a peripheral portion which is non-perforated so as to provide for the necessary pillowing. Ballooning is prevented upon exposure of the outer row or rows of perforations 26 to the atmosphere and the spacing of those perforations for the underlying generally rigid support surfacce 14 as defined by a concrete or other material floor 16. In this case, the air bag is of a longitudinal length which is excess of the load length L, thus forming a bag extension portion 56 which in turn forms a plenum chamber extension portion P' to the left of the plenum chamber P. An air inlet tube 28 constitutes a unitary part of the air bag and leads directly into the air bag 52 at the outer edge or fold line 59, remote from plenum chamber P. Seal lines S extend diagonally inwardly from that inlet tube 28 which in this case lies intermediate between the opposite longitudinal edges 22, 23 of the air bag. It is not necessary that seal lines S extend to some distance beneath the load bearing area as defined by load 12. They may extend only to the load line defined by end 12b of load 12.

A pair of oppositely directed diagonal seal lines S emanate at the outer edge of the bag 52 at points 30 where the tube 28 joines the plenum chamber extension portion P' and in this case they terminate at edges 22, 23 on each side of the tube, at some point within the load bearing area and beneath the load 12.

Further, while the seal line S has been shown as being a diagonal line, it may in fact be a curved one, and instead of joining the tube 28 at a sharp intersection, it may be rounded, the effect of which is to provide further strength to the junction of the air inlet tube 28 to plenum chamber extension portion P' of the air pallet. This applies to all embodiments of the invention.

From the above, it may be appreciated that with respect to most of the embodiments of the present invention, there is achieved an angulation between the tube inlet and the portion of the bag or flexible material in sheet form which defines the plenum chamber extension portion at the intersection of these two elements, this point being exterior to the load, acting to reduce the stress and further since air takes the path of least resistance, the air flows transversely and towards the load through this plenum chamber extension portion to progressively lift the load, distribute jacking of the load, and to provide automatic load balancing during movement of the same vertically relative to the flow or underlying fixed support surface. The angular seal line actually defines the outside edge of the plenum chamber extension portion to the side where the air inlet tube is connected.

Again, for the multiple embodiments, valving may be employed at each air inlet tube, this being necessary where there is more than one tube for supplying air to the air pallet plenum chamber. As in the invention of U.S. Pat. No. 3,948,344, the function of the air pallet is to first jack the load vertically upward to an extent determined by the pillowing control feature and the creation of a given height air film which maintains itself corresponding to the volume of air which escapes from the perforations, the air pressure within the plenum chamber P and the weight of the load 12 as well as the surface area supporting the same. The perforations are of relatively small diameter, as for instance pinholes, and extend cover a large surface area to automatically insure spreading of the air film over a maximum surface area, once the load is jacked and pillow height obtained.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An air pallet comprising:
    a relatively rigid planar backing member for supporting a load,
    said backing member including longitudinal and lateral side edges,
    a bottom, thin flexible sheet underlying said backing member, bearing perforations and having longitudinal side edges,
    means including at least said thin flexible sheet forming a plenum chamber for retaining pressurized air, thereby being formed between said bottom sheet and said backing member;
    whereby, said air pallet is supported for frictionless movement ovver a supporting surface,
    a portion of said bottom sheet extending laterally beyond at least one of said lateral sides of said backing member and being overlapped, forming a fold line therein with overlapped upper and lower portions which are sealed together along said longitudinal side edges thereof,
    a seal line joining said upper and lower overlapped portions of said thin flexible sheet and extending diagonally from said fold line to at least one of said longitudinal side edges,
    an air inlet means formed in said sheet at the end of said seal line adjacent said fold line;
    whereby, said pressurized air enters said plenum chamber through said air inlet means and is guided by said seal line towards said backing member to prevent rupture of said overlapped thin flexible sheet portions.

2. The air pallet as claimed in claim 1, wherein said seal line extends diagonally inwardly across said at least one plenum chamber extension portion and terminates beneath said load.

3. The air pallet as claimed in claim 1, wherein said generally rigid backing member comprises a corrugated slip sheet including at least one integral flap constituting a pull tab along one edge of the same, and wherein said thin flexible sheet comprises a flexible air bag, said air bag being mounted beneath said slip sheet, internally of said flap and including top and bottom walls, said top wall being fixed to the bottom of said slip sheet internally of said flap, and wherein said bottom wall defines with said top wall, said air pallet plenum chamber.

4. The air pallet as claimed in claim 1, wherein said air inlet means comprises an air inlet tube of relatively small diameter integral with said thin flexible sheet, and said diagonal seal line extends from the juncture of said tube and said thin flexible sheet to one side of said plenum chamber.

5. The air pallet as claimed in claim 4, wherein said generally rigid backing member comprises a generally rigid sheet, and said thin flexible sheet is edge sealed to respective edges of said rigid backing member to form said plenum chamber.

6. The air pallet as claimed in claim 1, wherein said generally rigid backing member comprises a generally rigid sheet and said thin flexible sheet is edge sealed to respective edges of said rigid backing member to form said plenum chamber.

7. The air pallet as claimed in claim 6, wherein said generally rigid backing member comprises a corrugated slip sheet including at least one integral flap constituting a pull tab along one edge of the same.

8. The air pallet as claimed in claim 1, wherein said thin flexible sheet comprises a flexible air bag including top and bottom walls defining said plenum chamber and being fixed to the bottom of said generally rigid backing member, said air bag top and bottom walls including integral extension portions extending beyond the lateral edges of said rigid backing member, and wherein diagonal seal lines sealably join said top and bottom walls of said air bag extension portion throughout a portion of the walls underlying said generally rigid backing member and the load supported thereby.

9. The air pallet as claimed in claim 8, wherein said flexible air bag includes pressure sensitive adhesive strips at least at the corners of said bag for fixing said bag to said generally rigid backing member.

10. The air pallet as claimed in claim 8, wherein said generally rigid backing member comprises a corrugated slip sheet including at least one integral flap constituting a pull tab along one edge of the same.

11. The air pallet as claimed in claim 1, wherein said generally rigid backing member comprises a corrugated slip sheet including at least one integral flap constituting a pull tab along one edge of the same.

* * * * *